United States Patent [19]

Kobayashi

[11] Patent Number: 4,468,051
[45] Date of Patent: Aug. 28, 1984

[54] MOTOR VEHICLE

[76] Inventor: Heitaro Kobayashi, 14-11, Sangen-Cho, Choshi-Shi, Chiba-Ken, Japan

[21] Appl. No.: 408,562

[22] Filed: Aug. 16, 1982

[30] Foreign Application Priority Data

Nov. 9, 1981 [JP] Japan .......................... 56-166684[U]
Jan. 20, 1982 [JP] Japan .......................... 57-5016[U]

[51] Int. Cl.³ ............................................ B60R 21/10
[52] U.S. Cl. .................... 280/751; 280/752; 296/24 R; 296/65 R
[58] Field of Search ................. 296/65 R, 24 R, 1 R; 280/751, 752; 160/238, 84

[56] References Cited

U.S. PATENT DOCUMENTS 3,183,033  5/1965  Stulbach ........................ 160/238
3,188,112  6/1965  Oelkrug ......................... 280/751
3,338,622  8/1967  Bachmann ...................... 296/65 R
3,500,894  3/1970  Pofferi ........................... 160/238
3,883,155  5/1975  Renner et al. .................. 280/751

Primary Examiner—Robert R. Song
Attorney, Agent, or Firm—Ladas & Parry

[57] ABSTRACT

In a motor vehicle having a plurality of front and rear seats, at least one of the front seats is turnable rearward to confront a rear seat and has a cushioning portion at an upper portion thereof; a curtain which can be drawn between the front seats is provided; and shock-absorbing materials are provided in the dashboard of the motor vehicle in front of the seat which is turnable rearward and on a side opposite to the rearside of the back rest of the rear seats. The curtain between the front seats serves to prevent the attention of the driver in one of the front seats from being distracted by the passenger in the adjoining front seat. The shock-absorbing materials are useful to improve the safety of the vehicle in the event of a collision.

11 Claims, 11 Drawing Figures

MOTOR VEHICLE

BACKGROUND OF THE INVENTION

This invention relates generally to motor vehicles (automobiles), and more specifically to a motor vehicle adapted to ensure safe driving and safety of a person seated beside the driver (hereinafter referred to as "front passenger") and a rear passenger seated on a rear seat.

Generally, among car accidents, the head-on collisions claim the most victims. In most of the head-on collisions, the front passenger plunges his head and face into the front window pane (windshield) of the motor vehicle, hitting his chest hard against the dashboard molding and is fatally injured in many cases, while the rear passenger strikes his head and other parts of his body violently against the back rest of a front seat and may be fatally injured. Such injury is caused by the absence of a suitable cushioning support for receiving the front passenger and the rear passenger thrown forward by inertial force.

In order to minimize such injury of the front passenger, motor vehicles have been proposed wherein the front seat for the passenger is made turnable rearwardly of the vehicle so as to confront one of the rear seats. In such type of motor vehicles, the back rest of the rearwardly turned front seat effectively prevents injury of the front passenger in the event of head-on collisions because the back rest serves to cushioningly support the front passenger's body and head and prevents him from plunging directly into the front part of the vehicle body.

Such type of motor vehicles are advantageous in the above respect, but disadvantageous in that when the front passenger seat is turned rearwardly, the driver is caused to face the front passenger in a direction oblique to the front-to-rear direction of the vehicle, which tends to cause the driver's attention to be distracted by the passenger especially when the driver has to look at the mirror of the vehicle on the side of the front passenger.

The rearwardly turned front passenger's seat is useful to secure the passenger's safety in the case of collision, but it is still desired to improve the safety.

SUMMARY OF THE INVENTION

The main object of the present invention is to provide a motor vehicle with safety driving means for preventing the driver's attention from being distracted by the front passenger in the rearwardly turned front seat.

A further object of the present invention is to provide a motor vehicle with means for ensuring safety of the front passenger as well as the rear passengers.

In order to fulfil the main object, the motor vehicle according to the present invention comprises means for enabling at least one of the front seats to turn rearwardly to confront a rear seat, and partition means capable of being drawn to a position between the front seats and removed from the position.

The partition means is preferably in the form of a curtain which can be drawn between the driver and the rearwardly facing front passenger. The curtain keeps the passenger seated facing rearwardly out of the driver's sight and serves to enable the driver to concentrate on driving the vehicle without being disturbed by the front passenger.

In order to attain the further object, the motor vehicle comprises cushioning means on the back rest of the rearwardly turnable front seat, and shock-absorbing means disposed in the body of the vehicle in front of the front seat.

The cushioning means and the shock-absorbing means cooperate to soften the shock to the passenger in the event of collision.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

Figure 1:
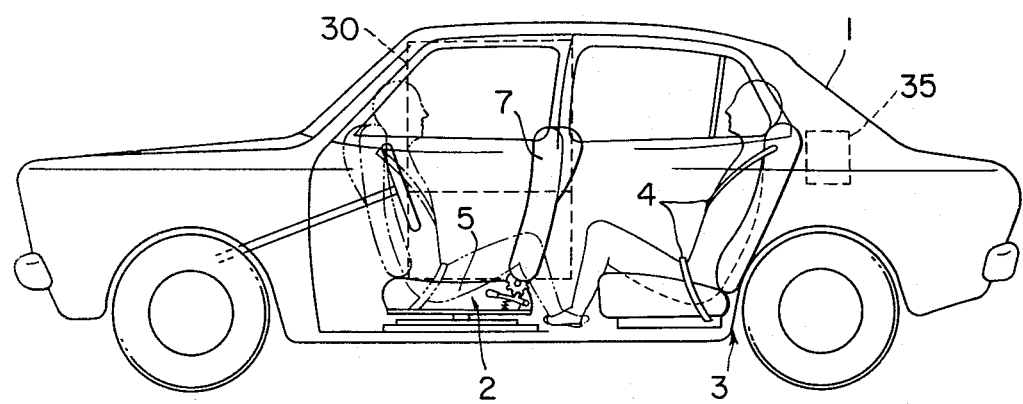
FIG. 1 is a left-side elevation, with some parts in phantom state, showing an embodiment of this invention.

As shown in FIG. 1, the car body 1 of the motor vehicle accommodates front seats 2 and the rear seat 3. Known safety belts 4 are fastened to the front seats 2 and the rear seat 3. The front seats 2 comprise the front passenger seat and the driver's seat. Each front seat 2 comprises a seat part 5 and a back rest 7.

Figure 2:
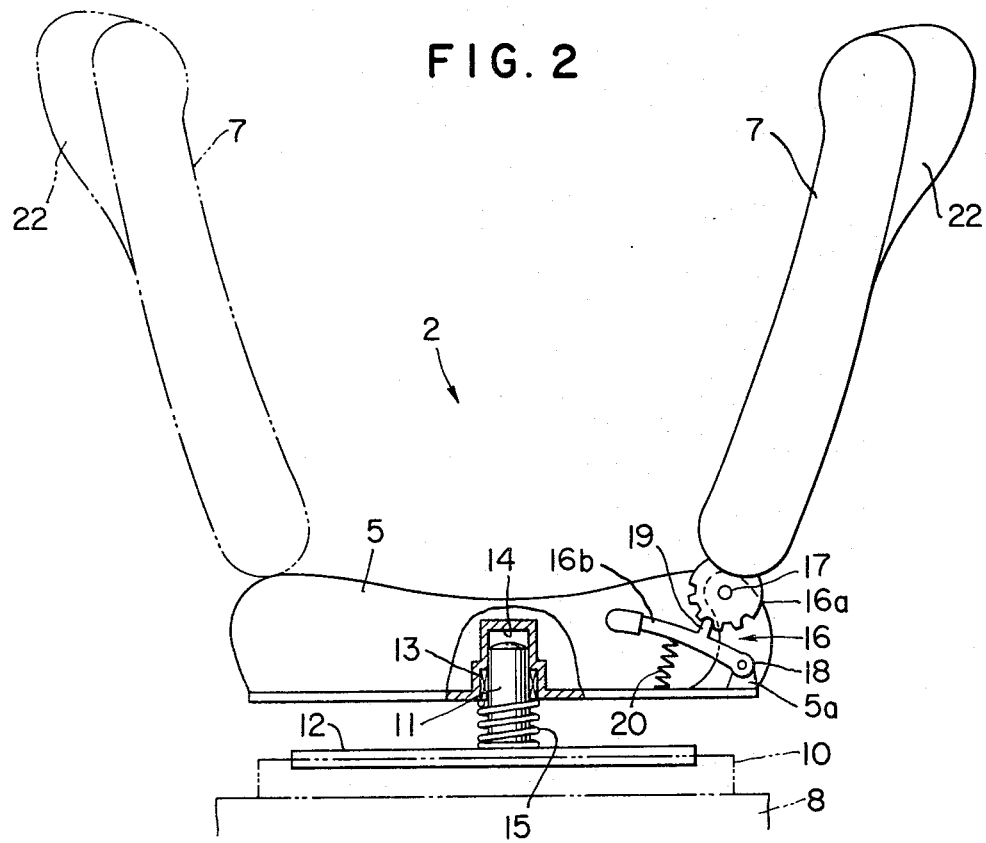
FIG. 2 is a side elevation, with a part cut away and a part shown in vertical section, of a front seat constituting an essential part of FIG. 3 is a perspective view of a back rest of the front seat shown in FIG. 2.

Below each seat part 5, as shown in FIG. 2, a pair of parallel, spaced-apart rails 10 are fixed in the front-and-back direction to the chassis 8 supporting the body 1. A slide member 12 is adapted to slide along and be guided by the rails 10.

The slide member 12 has a support post 11 fixed to the central part thereof and projecting vertically upward therefrom. This support post 11 at its upper part is inserted into a support hole 14 provided in the bottom of the seat part 5 to support the seat part 5 against horizontal displacement through the intermediary of a bearing 13, which permits rotation of the seat part 5 about the post 11. A coil spring 15 is disposed around the support post 11 and between the bottom part of the seat part 5 and the slide member 12, whereby the seat part 5 is borne by the coil spring 15.

The back rest 7 is pivotally connected at its lower end on left and right sides by pivot pins 17 (only one shown) to the rear end of the seat part 5. The back rest 7 is thus pivotally supported on one side via a cog wheel 16a which is fixed to its lower end and has gear teeth provided at the lower rim thereof. On a bracket 5a fixed to the rear part of the seat part 5 there is provided a reclining mechanism 16. This reclining mechanism 16 includes a pivot pin 18, a lock lever 16b pivoted at its one end by the pivot pin 18 and having a pawl 19 at an intermediate part thereof, a spring 20, and the above mentioned cog wheel 16a. The lock lever 16b is pivotally supported on the bracket 5a by the pivot pin 18. The pawl 19 is meshable with one of the teeth of the cog wheel 16a and is retained in meshed state by the spring 20.

When the reclining angle of the back rest 7 is changed, the lock lever 16b is operated to cause the pawl 19 to mesh with a different meshing tooth.

Figure 3:
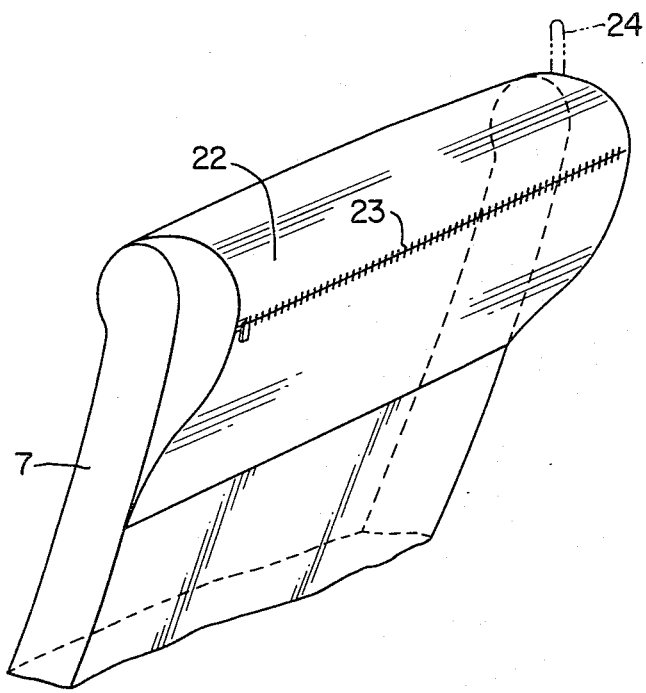

The back rest 7 has a bag 22 provided at the upper portion of the backside thereof. The bag 22 has a slit openable and closable by means of a zipper fastener 23 as shown in FIG. 3. The zipper fastner 23 is opened for placing a shock-cushioning material in the form of a pad in the bag 22 and is thereafter closed. A shock-absorbing means is defined in this manner at an upper part of the back rest of the passenger seat. FIG. 3 illustrates the state wherein the zipper fastner 23 is closed with the pad placed in the bag 22.

The pad may be replaced with air. For such replacement, as indicated by the chain line in FIG. 3, an air valve 24 is provided for feeding air into the bag 22 in place of the zipper fastener 23.

The front passenger seat 2 is turnable about the support 11 and lockable in a position in which it faces in the forward driving direction of the motor vehicle by a stop mechanism (not shown) or in a position 180° C. from the forward facing position. Suitable, known clickstop means is provided to lock the passenger seat 2 in the latter position.

Figure 4:
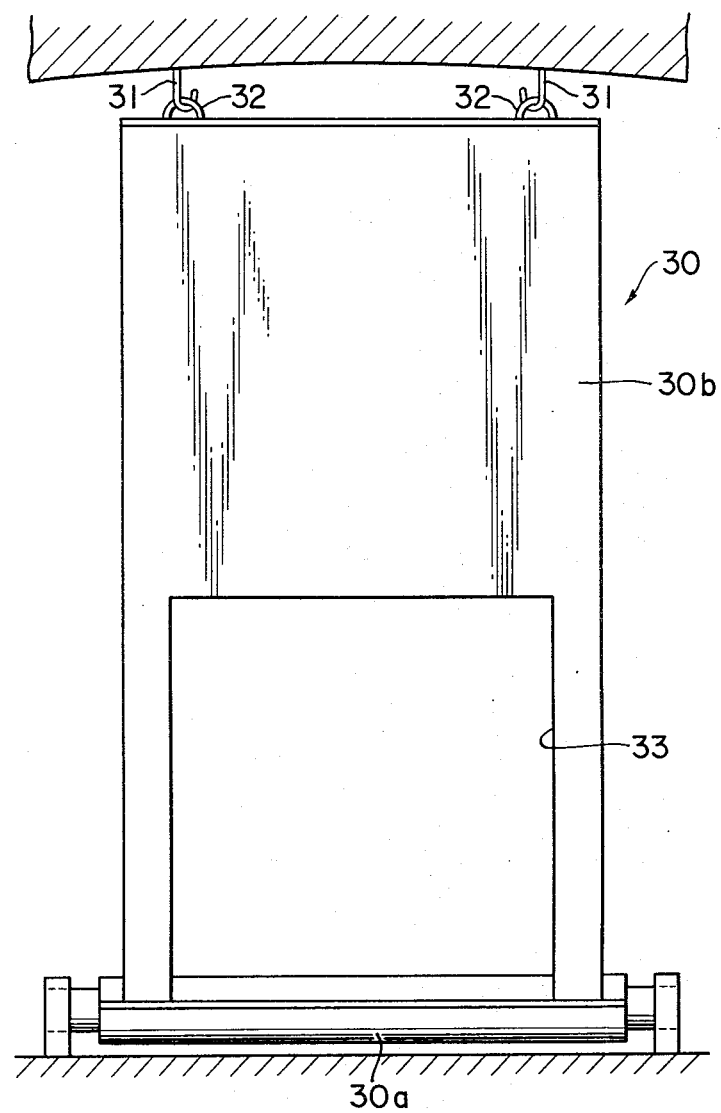
FIGS. 4 and 5 are side elevations respectively showing details of partitions of different construction.
Figure 5:
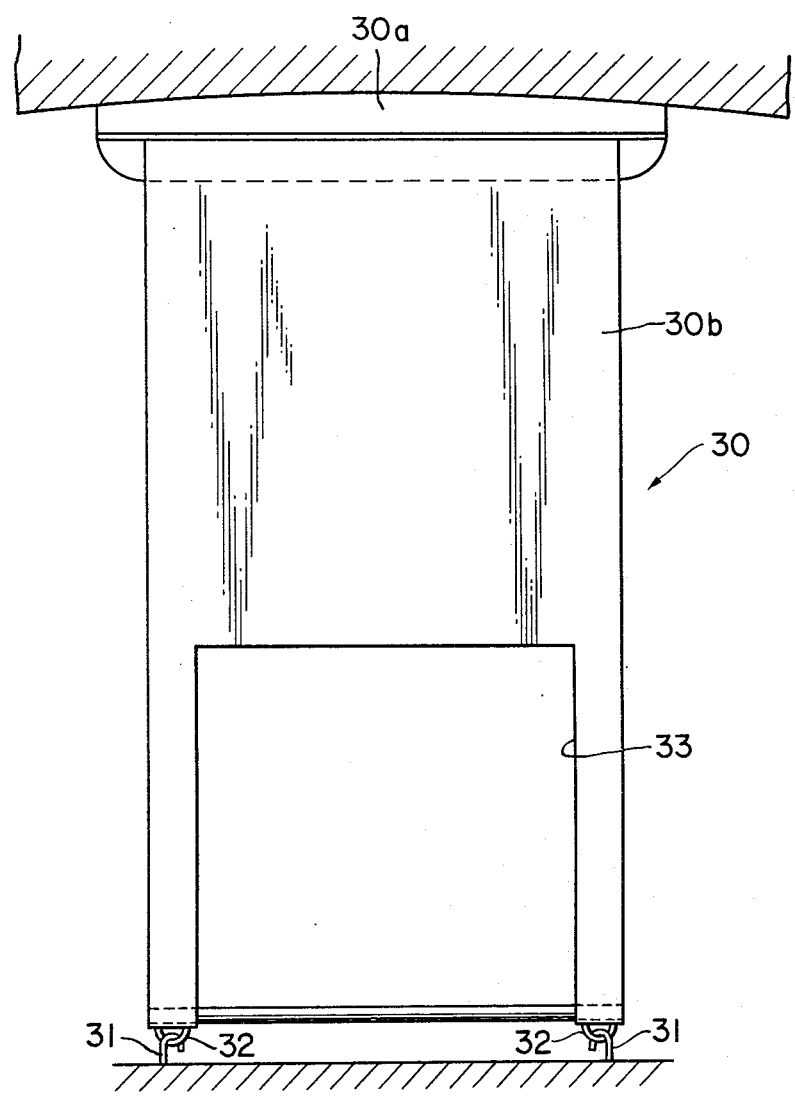

As indicated by the broken lines in FIG. 1, a partition 30 is rollably disposed between the driver's seat and the front passenger seat. As shown in FIGS. 4 and 5, the partition 30 may comprise a curtain 30b adapted to be drawn out of a roll-up part 30a mounted on the floor or the ceiling of the motor vehicle interior, respectively. The curtain 30b is preferably about 50 cm wide and made of a woven fabric, an unwoven fabric, a rubber sheet or the like.

Half rings 32 are attached to the end of the curtain to be pulled when it is drawn out of the roll-up part 30a. The half rings 32 are caught by hooks 31 disposed on the ceiling or the floor of the motor vehicle when the curtain 30b is drawn between the driver's seat and the front passenger seat.

The curtain 30b is rolled up around the roll-up part 30a by spring force or the driving force of a motor. A cutout 33 is provided in the curtain 30b between its lower end and a part about 50 cm below the upper end thereof so as to facilitate handing over of objects between the driver and the front passenger. For convenience while the curtain 30b is not in use, it is rolled up so as not to be obstructive.

If the driver feels that the passenger in the rearwardly turned front seat is obstructive to his concentration on driving the vehicle, he can draw the curtain 30b out of the roll-up part 30a and engage the half rings 32 with the hooks 31, whereby the curtain makes the front passenger invisible to him.

Figure 6:
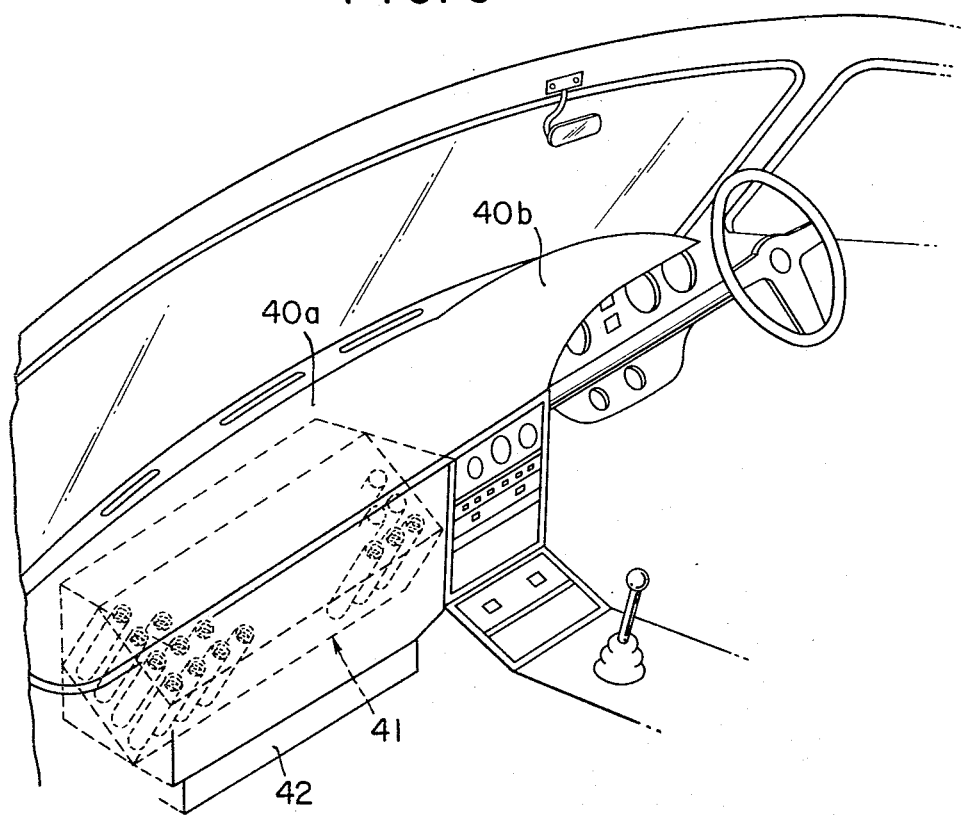
FIG. 6 is a perspective view showing an example of the construction of a dashboard with an impact-absorbing device according to this invention.

As shown in FIG. 6, the dashboard of the motor vehicle is made, at the part thereof in front of the front passenger seat, of a dashboard front face material 40a, in the form of a plate, for example, less hard than that 40b of the dashboard in front of the driver's seat so that the dashboard front face material 40a may be easily deformed in response to a strong shock. A shock-absorbing means 41 underlies the dashboard front face material 40a, and an accommodating part 42 is formed under the shock-absorbing means 41. At a position opposed to the backside of the back rest of the rear seat as well, there is provided a shock-absorbing means 35 as indicated by the broken lines in FIG. 1.

Figure 7:
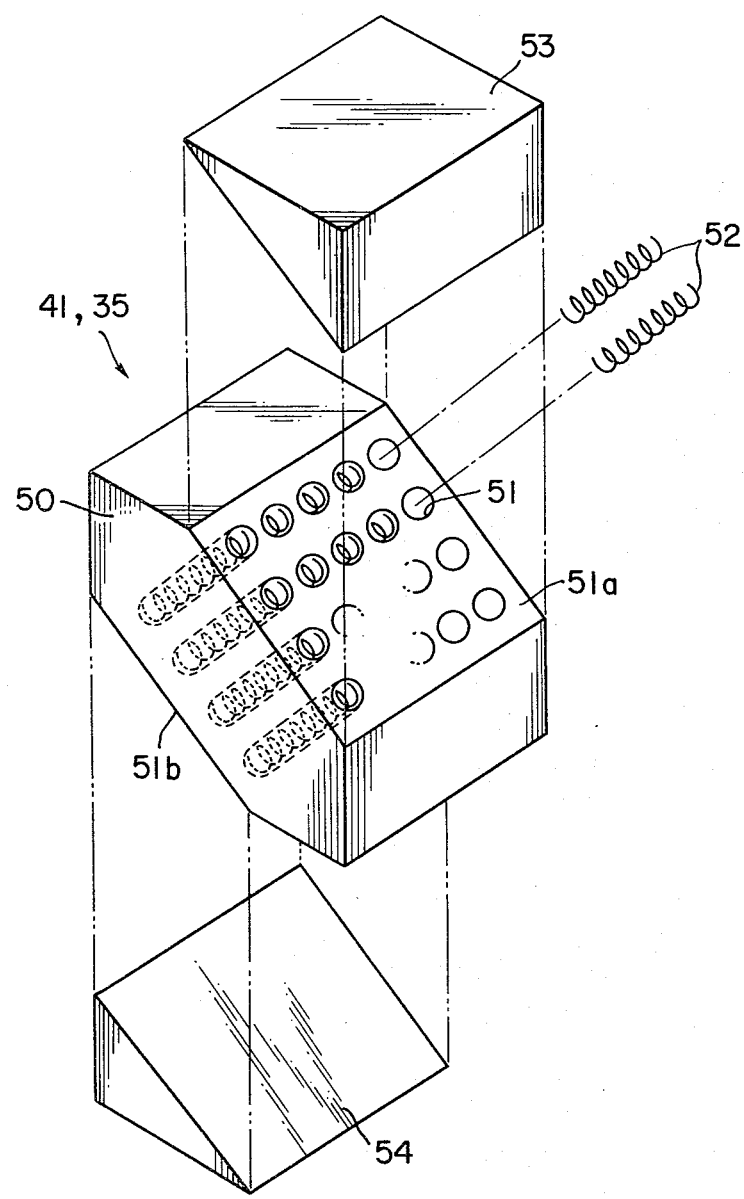
FIG. 7 is an exploded perspective view of an example of the shock-absorbing device built into the dashboard.
Figure 8:
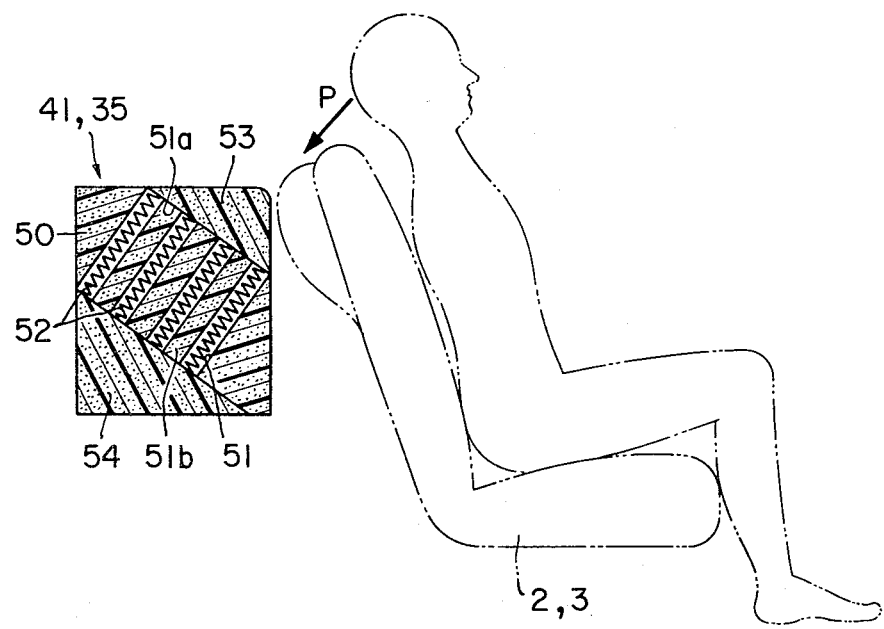
FIG. 8 is a side elevation showing the relationship between the shock-absorbing device and the back rest of a seat.

As shown in FIGS. 7 and 8, each of the shock-absorbing means 41 and 35 is made generally in a prismatic shape and comprises a base structure 50 made of a foamed synthetic resin, such as foamed polystyrene resin or the like, having through holes 51 accommodating a number of coil springs 52 therein, a cover 53 made of foamed polyurethane overlying the base structure 50, and a bottom mat 54 made of foamed polyurethane or synthetic fibers underlying the base structure 50. The prismatic material has a surface 51a cut perpendicularly to the direction of an expected shock load indicated by arrow P in FIG. 8 and a surface 51b opposite thereto. The through holes 51 are formed substantially perpendicularly to the surfaces 51a and 51b. As shown in FIG. 7, the cover 53 and the bottom mat 54 are of substantially triangular cross-section with inclined planes in contact with the surfaces 51a and 51b. The coil springs 52 are prevented from dropping out of the through holes 51 by the cover 53 and the bottom mat 54.

The shock-absorbing means 41 or 35 deforms with the dashboard front face material 40a or the surface material of the backside of the rear seat 3, respectively, to exert a shock-absorbing effect when the former comes into a violent contact with the latter, respectively. In this case, the shock can be drastically reduced as the axial direction of the coil springs 52 is in substantial alignment with the direction of a load (direction of impact) indicated by arrow P in FIG. 8.

Figure 9:
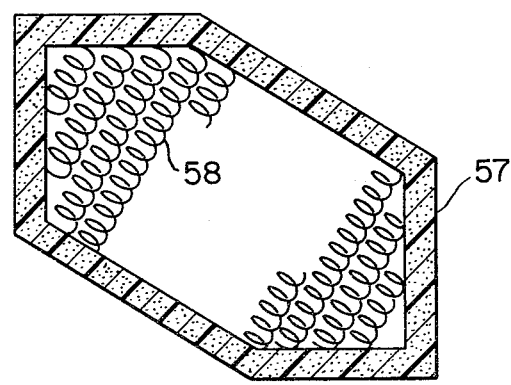
FIG. 9 is a side elevation, in vertical section, of a variation of the shock-absorbing device.

The shock-cushioning means 41 or 35 may be replaced with coil springs 58 assembled in a prismatic shape and coated with an outer surface material 57 made of a synthetic resinous foamed material, for instance as shown in FIG. 9.

Figure 10:
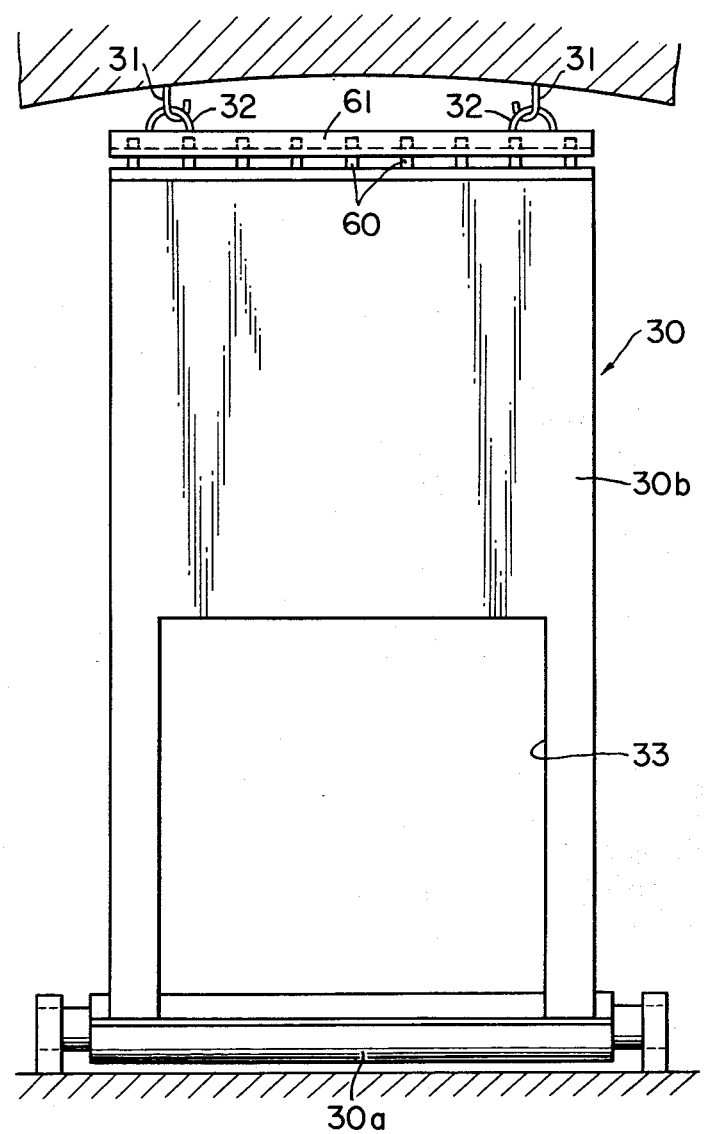
FIG. 10 is a side elevation showing details of a modification of the partition shown in FIG. 4.
Figure 11:
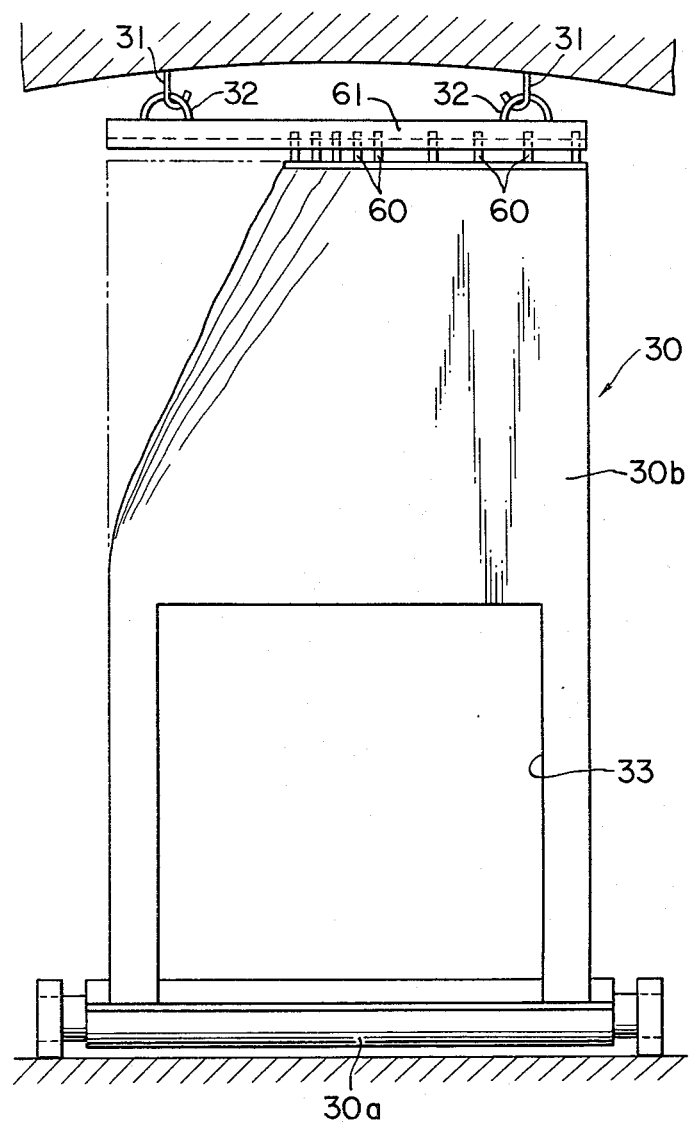
FIG. 11 is a view similar to FIG. 10 but showing the partition drawn partly rearward to broaden the field of view of the driver.

FIGS. 10 and 11 illustrate a modified form of the partition 30. When the partition 30 is pulled out between the driver's seat and the front passenger seat, the field of view of the driver on the side of the partition 30 tends to become narrow. The modified partition 30 shown in FIGS. 10 and 11 is effective to keep the driver's field of view broad enough even when the partition is in the pulled-out position. To this end, the partition 30 is made of a curtain 30b of soft cloth, for example, and a number of sliders 60 are attached to and along the upper edge or free end of the curtain 30b, the sliders 60 being engaged in the channel or groove of a curtain rod 61 and being slidable along the same. The curtain rod 61 has half rings 32 secured thereto and adapted to engage the respective hooks 31. In order to broaden the driver's field of view, the curtain 30b is drawn rearward at its forward upper portion as shown in FIG. 11, causing some sliders 60 to slide rearwardly relative to the curtain rod 61, whereby the driver can view forward and sidewise without being obstructed by the curtain 30b. When the curtain is to be wound up, it is brought to the state shown in FIG. 10 and then the half rings 32 are disengaged from the hooks 31, whereby the curtain is rolled up around the roll-up part 30a.

What is claimed is:

1. A motor vehicle having a plurality of front seats each with a back rest, rear seats and dashboard means in front of the front seats, said vehicle comprising:
   means for mounting at least one of the front seats in a manner turnable rearwardly to confront one of the rear seats; cushioning means bulging rearwardly from the upper part of the back rest of the rearwardly turnable front seat; and shock-absorbing means disposed in the dashboard means at such a position closely confronting said cushioning means when the rearwardly turnable front seat is turned rearwardly, said shock-absorbing means comprising a cushioning body accommodating therein coil springs the axial centerlines of which are in substantial alignment with the direction of the load to be exerted to the shock-absorbing means as a result of collision of said cushioning means against the dashboard means with the rearwardly turnable front seat turned rearwardly.

2. The motor vehicle as claimed in claim 1, wherein said partition means is in the form of a sheet, and roll-up means is provided on the interior wall of the body of the vehicle to wind up the sheet thereon.

3. The motor vehicle as claimed in claim 1, wherein said partition means has a cutout enabling communication between the front seats when the partition means is drawn between the front seats.

4. The motor vehicle as claimed in claim 2, wherein said roll-up means is secured to the floor of the vehicle, and the ceiling of the vehicle has engaging means for detachably retaining the free end of the sheet paid out from the roll-up means.

5. The motor vehicle as claimed in claim 2, wherein said roll-up means is secured to the ceiling of the vehicle, and the floor of the vehicle has engaging means for detachably retaining the free end of the sheet paid out from the roll-up means.

6. The motor vehicle as claimed in claim 1, further comprising cushioning means on the back rests of the rear seats, and shock-absorbing means disposed in the body of the vehicle rearward of the rear seats.

7. The motor vehicle as claimed in claim 1, wherein said cushioning body has holes for accommodating the respective coil springs.

8. The motor vehicle as claimed in claim 7, wherein said cushioning body has upper and lower surfaces extending perpendicularly to the direction of the expected load, and said holes are open to the surfaces, said upper and lower surfaces being applied with a cover and a bottom mat, respectively, for preventing the coil springs in the holes from dropping out.

9. The motor vehicle as claimed in claim 1, wherein said cushioning body has a hollow interior space within which the coil springs are disposed.

10. The motor vehicle as claimed in claim 1, wherein the part of the dashboard means covering the shock-absorbing means is less hard than the other part of the dashboard means.

11. The motor vehicle as claimed in claim 1, further comprising partition means capable of being drawn to, and removed from a position between said front seats.

* * * * *